United States Patent [19]
Gonzales et al.

[11] Patent Number: 5,833,499
[45] Date of Patent: Nov. 10, 1998

[54] INSULATED BATTERY-CABLE CONNECTOR

[75] Inventors: Philip Michael Gonzales, Dearborn, Mich.; David Eugene May, E. Berne, Ind.; Jeffrey Stone, Lathrup Village, Mich.

[73] Assignees: Ford Global Technologies, Inc.; United Technologies Automotive, Inc., both of Dearborn, Mich.

[21] Appl. No.: 786,491

[22] Filed: Jan. 21, 1997

[51] Int. Cl.⁶ ........................................... H01R 4/30
[52] U.S. Cl. ............................. 439/755; 439/522
[58] Field of Search ....................... 439/521, 522, 439/755

[56] References Cited

U.S. PATENT DOCUMENTS

| | | | |
|---|---|---|---|
| 3,775,730 | 11/1973 | Rowls et al. | 439/755 |
| 3,928,079 | 12/1975 | Jennings et al. | 439/522 |
| 4,288,504 | 9/1981 | Julian et al. | 439/522 |
| 4,420,213 | 12/1983 | Julian et al. | 439/522 |
| 4,483,910 | 11/1984 | Julian | 439/521 |
| 4,952,171 | 8/1990 | Sugiyama | 439/522 |
| 5,346,407 | 9/1994 | Hood | 439/522 |
| 5,346,408 | 9/1994 | Chupak | 439/522 |

*Primary Examiner*—Neil Abrams
*Assistant Examiner*—T. C. Patel
*Attorney, Agent, or Firm*—Damian Porcari

[57] ABSTRACT

An encapsulated electrical connector is molded to the end portion of a battery cable to provide a releasable electrical connection between the cable and a battery terminal. The dielectric molding includes a hinged cover that is automatically moved to a readily visible angulation when the connector is inserted onto the battery terminal.

10 Claims, 1 Drawing Sheet

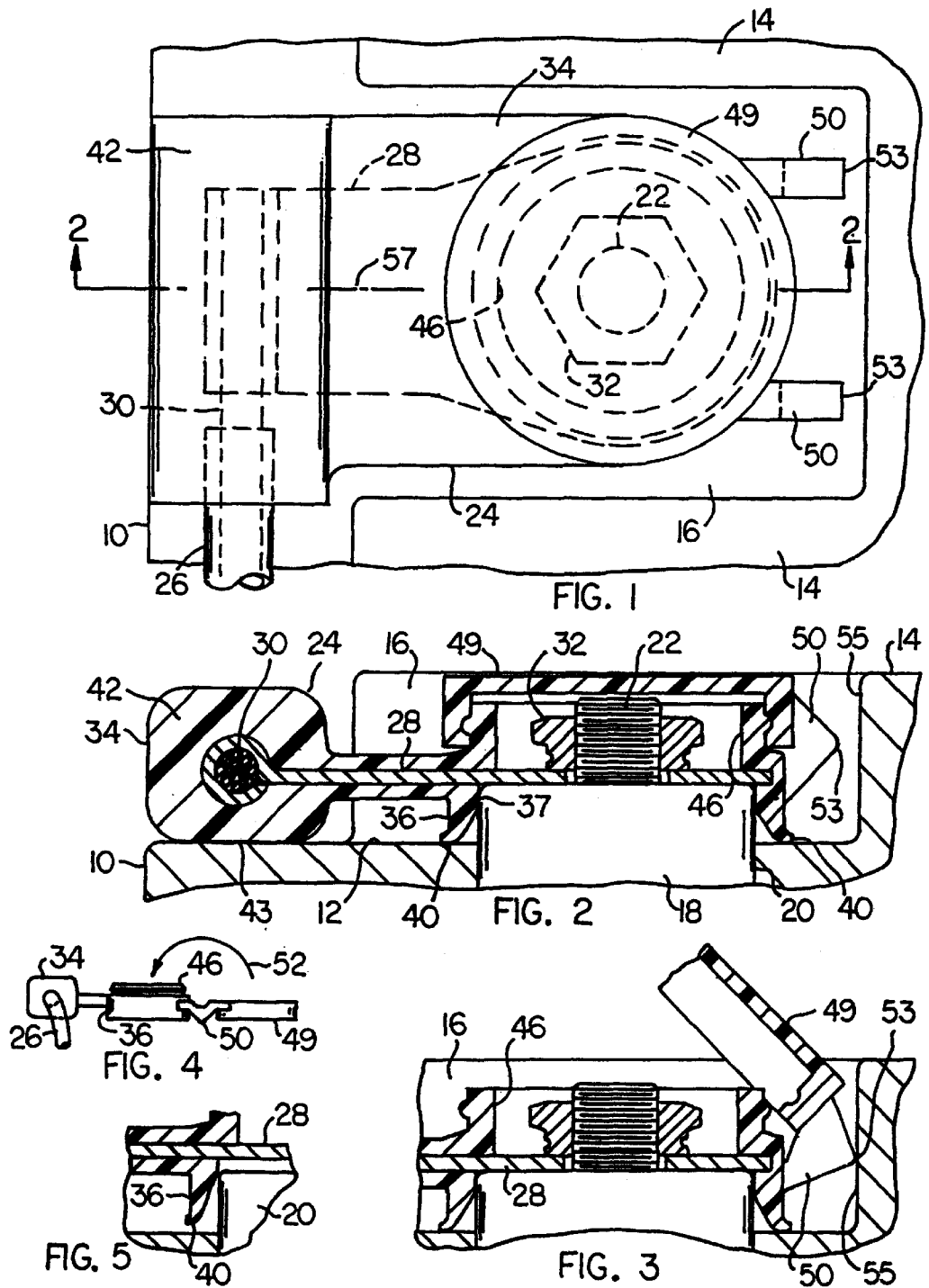

INSULATED BATTERY-CABLE CONNECTOR

BACKGROUND OF THE INVENTION

1. Field of the Invention

This invention relates to an insulated connector for electrically connecting an electrical cable to the terminal of a wet cell battery, e.g. a battery used in an automotive vehicle. The invention has special utility with batteries employed in electric vehicles.

2. Description of the Related Art

It is known that battery cables can be connected to the terminals of wet cell batteries, using plate-like connectors encapsulated within molded dielectric end fittings. It is also known that such molded end fittings can be equipped with openable covers for normally sealing the electric connection while providing access to the terminal when necessary, e.g. to disconnect the cable from the battery.

A conventional end fitting includes having the above-described features. The connector construction shown in U.S. Pat. No. 3,928,079 includes a flat conductive plate attached to a multi-strand wire cable and a molded insulator sheath encapsulating the conductive plate and an end portion of the cable. An openable cover separate from the molded sheath is attached to the molded sheath by means of a flexible strap.

SUMMARY OF THE INVENTION

The present invention relates to a cable-battery terminal connector wherein a flat conductive terminal (or plate) is encapsulated within a dielectric molding, to provide a seal around the terminal. A cover is hingedly connected to the molding by a hinge structure that is integral with the cover and molding; the cover and molding can thus be formed together in a single molding operation.

According to one embodiment, the dielectric molding includes an enlarged section that encapsulates the portion of the cable attached to the conductive plate, whereby the cable-plate attachment is shielded against atmospheric corrosion and the cable can be attached from either side. In preferred practice of the invention, the molding is offset from the cable so that the cable can run along the top surface of the battery; the molding is designed to be symmetrical around a transverse axis so that the cable can approach the battery terminal from one of two directions, dependent on how the encapsulation is molded around the connector; the connection is ambidextrous. An enlarged section of the molding has a flat lower surface adapted to rest on the upper surface of the battery, so as to reduce mechanical loading on the connection between the conductive plate and battery terminal.

The dielectric molding is designed to achieve a double seal around the battery terminal. The hinged cover provides an additional seal at the access opening for the terminal. In preferred practice of the invention the hinge for the cover includes a cam mechanism that engages the battery to tilt the cover up to a partially closed condition when the insulated connector is inserted onto the battery terminal. This feature visually accents the cover, such that the technician readily perceives that the cover has to be closed and no accidental electrical connection is made; there is a lessened likelihood that the cover will inadvertently be left in an opened condition. This feature of the cover is also advantageous in that the terminal is partially shielded against accidental shorting by an assembly or service tool.

Particular features of the invention will be apparent from the attached drawings and description of an illustrative embodiment of the invention.

BRIEF DESCRIPTION OF THE DRAWINGS

FIG. 1 is a top plan view of an insulated connector embodying the invention.

FIG. 2 is a sectional view taken on line 2—2 in FIG. 1.

FIG. 3 is a fragmentary view taken in the same direction as FIG. 2, but showing a cover in an open position.

FIG. 4 is a side elevational view of the FIG. 1 connector, detached from the battery, and shown on a greatly reduced scale.

FIG. 5 is a fragmentary sectional view taken in the same direction as FIGS. 2 and 3, but showing the connector in a transitional state during the process of inserting the connector onto the battery.

DETAILED DESCRIPTION OF THE PREFERRED EMBODIMENTS

Referring to FIGS. 1 and 2, a wet-cell battery 10 has an upper surface 12 downwardly recessed from a raised wall area 14 to form an upwardly open pocket 16 for Accommodating a top access terminal 18. The terminal comprises a cylindrical post 20 and upstanding threaded stud 22.

The present invention is particularly concerned with an insulated connector 24 molded onto battery cable 26 to provide a sealed electrical connection between the cable and the battery terminal 18. Insulated connector 24 comprises a flat conductive plate 28 suitably attached to the multi-strand wire core 30 of the cable, e.g. by crimping, soldering and/or brazing. In the preferred embodiment, the cable is crimped to the plate using U-shaped ferrules which are symmetrical about the cable axis. Thus one plate 28 can be used for right or left-wise extending cables. Plate 28 is adapted to be positioned flat-wise on the annular shoulder at the upper end of post 20.

A threaded clamping nut 32 is threaded onto stud 22 to releasably clamp plate 28 to the battery terminal. In an alternative arrangement, not shown, the threaded stud 22 and nut 32 are replaced with a bolt that is threaded into a threaded hole in the post 20.

A dielectric plastic molding 34 encapsulates plate 28 against exposure to the ambient atmosphere. A conductive portion 35 of the plate is exposed. As shown in FIG. 2, molding 34 comprises a sleeve 36 extending downwardly from plate 28 to telescopically fit on the side surface of terminal post 20. Internal cylindrical surface 37 of sleeve 36 has a close frictional fit on the post side surface, sufficient to form an annular seal. The lower annular edge 40 of sleeve 36 abuts battery surface 12 to form a second seal. The axial length of sleeve 36 is preferably somewhat greater than the exposed eight of terminal post 20 (as shown in FIG. 5), such that when the insulated connector is clamped to the terminal, the annular edge 40 of the sleeve has pressure contact with surface 12 so as to provide a reliable pressure seal.

Plastic molding 34 comprises an integral enlarged section 42 that surrounds the portion of wire core 30 that is attached to conductive plate 28. This enlarged section 42 has a flat lower surface 43 adapted to rest on battery surface 12 when plate 28 is clamped to terminal 18 by the clamping nut 32. With such an arrangement the cantilever mechanical loading imposed by the cable on the clamped connection is largely transmitted to battery surface 12, such that the clamping nut 32 has minimal tendency to loosen on stud 22.

Plastic molding 34 further comprises an integral upstanding annular protective wall 46 adapted to surround the threaded clamp means 32. As shown in FIG. 2, the access opening at the upper end of annular wall 46 is closed by a cover 49. FIG. 3 shows the cover in a partially closed (partially open) condition.

Cover 49 is connected to sleeve portion 36 of the dielectric molding 34 by two similar hinges 50 that are integral with sleeve portion 36. FIG. 4 shows the molded unit in the as-molded condition; cover 49 is in an open condition spaced laterally from the annular wall 46. Arrow 52 illustrates an arcuate movement of cover 49 for achieving the closed condition depicted in FIG. 3. Cover 49 is molded integrally with dielectric molding 34 in a single molding operation.

Each hinge 50 has a protruding cam 53 that is adapted to contact surface 55 of the battery when the encapsulated connector is initially pushed down onto the battery terminal 18. The cam action between surface 55 and cams 53, 53 causes cover 49 to assume the partially closed condition depict ed in FIG. 3. In the FIG. 3 condition, cover 49 is acutely angled upwardly relative to the plane of conductive plate 28, such that cover 49 has a clearly visible appearance that alerts the technician to the fact that the cover is not closed. He is made aware of the need to close the cover in order to achieve a sealed condition (as per FIG. 2). This feature is especially important where there is a bank of batteries, e.g. in an electric vehicle.

Annular wall 46 and cover 49 have an annular bead and groove that fit together to form an annular seal isolating the battery terminal from the ambient atmosphere, and protecting the conductive portion 35 from foreign objects. This third annular seal is in addition to the first and second annular seals at 37 and 40.

The encapsulated connector has a relatively low manufacturing cost when manufactured in reasonably large quantities. Additionally the connector has a low profile design that minimizes the vertical thickness dimension of the connector. This feature enables the electrical connection to be made without increasing the overall height of the battery. Thus, as shown in FIG. 2, the insulated connector is located in a pocket 16 below the plane of battery surface 14.

It will be noted from FIG. 1 that conductive plate 28 is symmetrical around an imaginary plane (or axis) 57 extending transverse to the cable 26 direction. This symmetry enables the plastic molding 34 to be molded so that the cable approaches the battery terminal from one of two horizontal directions. As shown, molding 34 extends rightwardly from cable 26; however, by changing the disposition of the cable in the mold cavity it is possible to have molding 34 extend leftwardly from the cable (as viewed in FIG. 1). This left hand-right hand ambidexterity is advantageous in certain situations.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include but are not limited to modifying the shape of the cover from annular to some other shape. It is therefore contemplated that the appended claims will cover any such modification or embodiments that fall within the true scope of the inventions.

What is claimed:

1. An insulated battery-cable connector comprising:
   a conductive plate engageable with a battery terminal;
   a dielectric molding encapsulating said conductive plate;
   said molding comprising a protective wall extending from said plate;
   a cover for said protective wall; and hinge means joining said cover to said molding;
   said hinge means comprising a cam means engageable with the battery to swing said cover to a partially closed position extending away from the battery when said insulated connector is inserted on the battery terminal.

2. The insulated connector of claim 1, wherein said cover is acutely angled to the plane of said conductive plate at an easily observable angulation when said cover is in its partially closed position.

3. The insulated connector of claim 2, wherein said cover and said hinge means are molded integrally with said dielectric molding.

4. The insulated connector of claim 1, wherein said dielectric molding comprises an enlarged section surrounding a portion of the cable that is attached to said conductive plate; said enlarged section of the dielectric molding being adapted to rest against the battery when said conductive plate is clamped to the battery terminal.

5. An insulated connector for operatively attaching an electric cable to an upstanding top access terminal on a battery; said connector comprising:
   a conductive plate attached to the cable;
   said plate being adapted for horizontal flat-wise positionment on a horizontal shoulder surface of a battery terminal;
   threaded clamp means having a screw-on connection with the terminal for releasably clamping said plate to the shoulder surface of the terminal;
   a dielectric molding encapsulating said conductive plate and a portion of the cable;
   said molding comprising a sleeve extending downwardly from said plate for telescopically fitting a side surface of the terminal to form a first annular seal, and an annular protective wall extending upwardly from said plate to surround said threaded clamp means;
   a cover telescopically engageable with said protective wall to form a second annular seal;
   said sleeve having a deflectable annular lower edge engageable with the battery to form a third annular seal;
   hinge means joining said cover to said molding;
   said hinge means comprising cam means engageable with the battery to swing said cover to a partially closed position extending upwardly away from the battery when said insulated connector is inserted on the battery terminal;
   said dielectric molding comprising an enlarged dielectric section surrounding the cable that is attached to said conductive plate;
   said enlarged section having a lower surface adapted to rest against an upper surface of the battery when said conductive plate is clamped to the battery terminal.

6. An insulated connector for operatively attaching an electric cable to an upstanding top access terminal on a battery; said connector comprising:
   a conductive plate attachable to a cable and engageable flatwise on a top access battery terminal;
   threaded clamp means having a screw-on connection with said terminal for releasably clamping said plate to the terminal;
   a dielectric molding encapsulating said conductive plate;
   said molding comprising a sleeve extending downwardly from said plate for telescopically fitting on a side surface of the battery terminal to form a first seal;

said molding further comprising an annular protective wall extending upwardly from said plate to surround said threaded clamp means; and a cover carried by said molding for telescopment onto said annular protective wall to form a second seal; said dielectic molding comprising an enlarged section surrounding a portion of the cable that is attached to said conductive plate; said enlarged section of the dielectic molding being oriented to rest against the battery top surface when said conductive plate is clamped to the battery terminal.

7. The insulated connector of claim 6, and further comprising hinge means joining said cover to said molding; said hinge means comprising a cam means engageable with the battery to swing said cover to a partially closed position extending away from the battery when said insulated connector is inserted on the battery terminal.

8. The insulated connector of claim 6, wherein said conductive plate has a longitudinal axis (57) that extends transverse to the direction taken by the attached cable.

9. The insulated connector of claim 6, wherein said cover is acutely angled to the plane of said conductive plate at an easily observable angulation when said cover is in its partially closed position.

10. The insulated connector of claim 6, wherein said cover and said hinge means are molded integrally with said dielectric molding.

* * * * *